No. 821,432. PATENTED MAY 22, 1906.
W. H. PROCTER.
LUBRICATING DEVICE.
APPLICATION FILED NOV. 25, 1904.
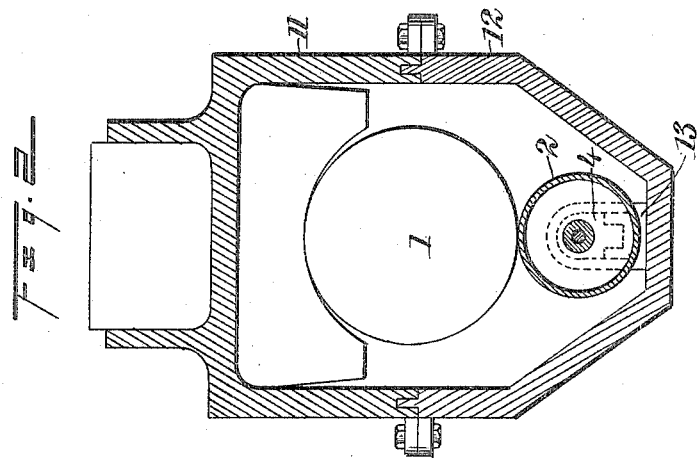
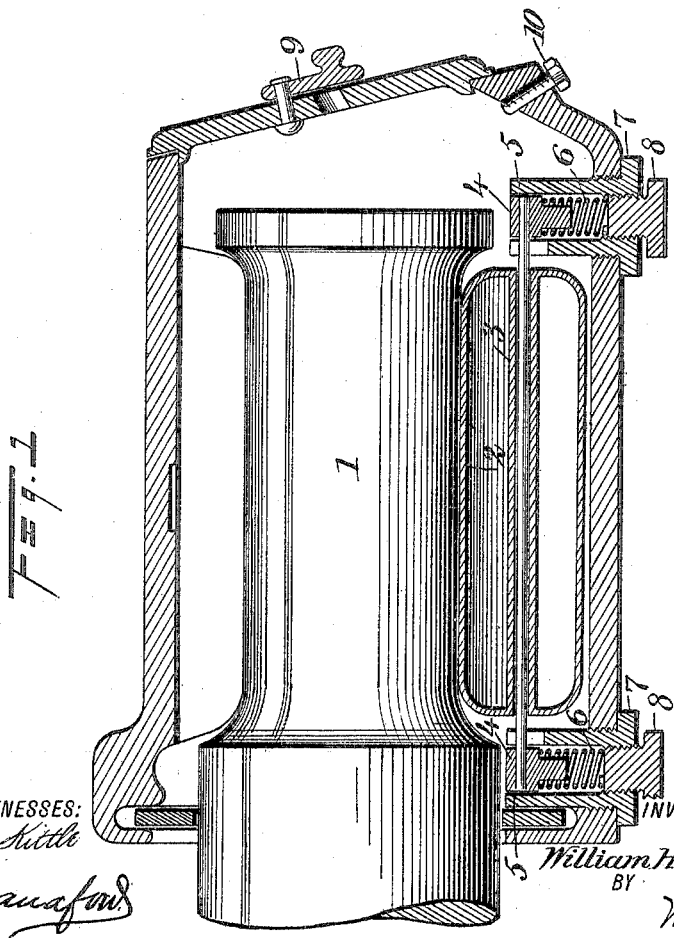
WITNESSES:
John J. Kittle
INVENTOR
William Henry Procter
BY
ATTORNEYS

UNITED STATES PATENT OFFICE.

WILLIAM HENRY PROCTER, OF JATNI, INDIA.

LUBRICATING DEVICE.

No. 821,432.  Specification of Letters Patent.  Patented May 22, 1906.

Application filed November 25, 1904. Serial No. 234,219.

*To all whom it may concern:*

Be it known that I, WILLIAM HENRY PROCTER, engine-driver of Bengal-Nagpore railway, a subject of His Majesty King Edward VII, Emperor of India, residing at Loco Buildings, Khurda Road, Jatni, Bengal, British India, have invented an Improved Lubricating Device, of which the following is a full, clear, and exact specification.

This invention relates to improvements in lubricators for bearings, cranks, shafts, slide-blocks, eccentrics, and other moving parts, and has for its object the thorough lubrication of the bearing-surfaces. For this purpose I provide a cylinder or roller which is revolubly mounted, so that it runs in an oil-bath, and its upper periphery is in adhesive contact with the journal or other part to be lubricated. As the journal or other part to be lubricated rotates the cylinder or roller is caused to revolve in the opposite direction, and as it revolves it carries up on its surface a continuous supply of oil to the journal and keeps it thoroughly lubricated. The device may also be mounted in or on slide-blocks or the like, to which a reciprocating motion is imparted, the cylinder or roller being adapted to run on the under side of the guide-bar on which the slide-block works, so that it will rotate first in one direction and then in the other. The roller should be of such a size that it makes more than one complete revolution in either direction.

The cylinder or roller is preferably of thin steel or other hard metal and is hollow and free to rotate on its spindle. The projecting ends of the spindle are mounted in bearings in sliding blocks, which work in guides and have springs to keep the cylinder or roller pressing lightly against the journal or other part to be lubricated. Means are also preferably provided to enable the pressure of the springs to be adjusted to the desired degree.

The device may be applied to existing machinery, and for the sake of example I will now proceed to describe an ordinary railway axle-box fitted with the present invention.

In the accompanying drawings, Figure 1 is a vertical section of an axle-box, and Fig. 2 is a cross-section of a modified form.

Referring now to Fig. 1, on the under side of the journal 1 a cylinder or roller 2 presses. This cylinder or roller 2 is mounted loosely on its spindle 3, the ends of which are carried in bearings in sliding blocks 4, which work in guides or nipples 5. Springs 6 are provided to keep the cylinder or roller 2 in contact with the journal 1. Screw-plugs 7, carrying the guides 5, are fitted into the bottom of the journal-box, and an adjusting-screw 8 is provided, passing through each screw-plug 7, by which the pressure of the springs 6 may be altered. The oil is poured in through an aperture in the lid, which is closed by the cover 9, and in order that the attendant may know how much oil or other lubricant to put in a plug 10 is provided, which he removes when pouring in the lubricant. When the lubricant reaches the level of this plug, it will overflow through the hole, indicating that the right amount has been put in. The plug is then replaced. The plug-hole is preferably on a level with the cylinder 2.

When an axle-box is made specially for use with the present invention, it is preferably made in two halves 11 and 12, as shown in Fig. 2. Lugs 13 are cast on the lower half 12 to form guides for the sliding blocks 4. The two halves are preferably made to dovetail into one another, as shown, to exclude dust and prevent the oil splashing out.

The size and mountings of the cylinder or roller may of course be varied for different requirements without departing from the general spirit of the invention.

Having now particularly described and ascertained the nature of my said invention and in what manner the same is to be performed, I declare that what I claim is—

1. In a lubricating device the combination with the journal, of a journal-box having a plurality of screw-threaded openings in its bottom, slotted nipples engaging said openings and having their outer ends internally screw-threaded, there being flanges on the nipples for engaging the outer ends of the journal-box, bearings slidably mounted on the nipples, springs for supporting the bearings, screw-threaded plugs engaging the screw-threaded openings of the nipples and supporting the springs, a spindle supported at each end by the bearings, and a roller on the spindle engaging the journal and adapted to be rotated thereby.

2. In a lubricating device, the combination with the journal, of a journal-box having a plurality of openings in its bottom, slotted nipples engaging the openings, there being flanges on the nipples for engaging the outer faces of the journal-box, bearings slidably mounted in the nipples, springs supporting the bearings, plugs within the nipples for supporting the springs, a spindle having its ends mounted in the bearings, and a roller on the spindle engaging the journal and adapted to be rotated thereby.

3. In a lubricating device, the combination with the journal, of the journal-box, slotted nipples traversing openings in the bottom of the journal-box, spring-actuated bearings in the nipples, means within the nipples for adjusting the springs, a spindle supported at each end by the bearings, and a roller on the spindle engaging the journal and adapted to be rotated thereby.

4. In a lubricating device, the combination with the journal, of the journal-box, spring-actuated bearings within the journal-box below the journal, means without the journal-box for adjusting the springs, a spindle supported at each end by the bearings, and a roller on the spindle engaging the journal and adapted to be rotated thereby.

5. In a lubricating device, the combination with the journal-box, of the journal, a spindle below the journal, a roller on the spindle and engaging the journal, spring-actuated bearings within the journal-box for supporting the spindle, and means without the journal-box for adjusting the bearings.

In witness whereof I have hereunto set my hand in the presence of two witnesses.

WILLIAM HENRY PROCTER.

Witnesses:
C. H. REMFRY,
H. G. REMFRY.